(12) United States Patent
Shaabana et al.

(10) Patent No.: US 12,106,203 B2
(45) Date of Patent: Oct. 1, 2024

(54) NEURAL NETWORK MODEL FOR PREDICTING USAGE IN A HYPER-CONVERGED INFRASTRUCTURE

(71) Applicant: VMware LLC, Palo Alto, CA (US)

(72) Inventors: Alaa Shaabana, San Bruno, CA (US); Gregory Jean-Baptiste, Mountain View, CA (US); Anant Agarwal, San Jose, CA (US); Rahul Chandrasekaran, Los Altos, CA (US); Pawan Saxena, Pleasanton, CA (US)

(73) Assignee: VMware LLC, Palo Alto, CA (US)

( * ) Notice: Subject to any disclaimer, the term of this patent is extended or adjusted under 35 U.S.C. 154(b) by 1325 days.

(21) Appl. No.: 16/033,460

(22) Filed: Jul. 12, 2018

(65) Prior Publication Data

US 2020/0019841 A1    Jan. 16, 2020

(51) Int. Cl.
  *G06N 3/044* (2023.01)
  *G06F 9/50* (2006.01)
  *G06N 3/08* (2023.01)
  *G06N 20/00* (2019.01)

(52) U.S. Cl.
  CPC .............. *G06N 3/044* (2023.01); *G06F 9/505* (2013.01); *G06N 3/08* (2013.01); *G06N 20/00* (2019.01)

(58) Field of Classification Search
  CPC ........ G06N 3/0445; G06N 3/08; G06N 20/00; G06F 9/505
  See application file for complete search history.

(56) References Cited

U.S. PATENT DOCUMENTS

| | | | | |
|---|---|---|---|---|
| 10,447,806 | B1* | 10/2019 | Sahay | H04L 41/12 |
| 10,841,236 | B1* | 11/2020 | Jin | H04L 67/1014 |
| 2015/0006711 | A1* | 1/2015 | Schaad | H04L 67/1097 709/224 |
| 2015/0288571 | A1* | 10/2015 | Baughman | H04L 41/147 703/21 |
| 2016/0140391 | A1* | 5/2016 | Kim | G06T 7/20 382/103 |
| 2017/0344400 | A1* | 11/2017 | Birke | G06F 9/5022 |
| 2018/0314998 | A1* | 11/2018 | Liu | G06Q 10/04 |
| 2018/0349168 | A1* | 12/2018 | Ahmed | G06F 11/3006 |
| 2019/0050726 | A1* | 2/2019 | Azaria | G06F 16/248 |
| 2020/0012921 | A1* | 1/2020 | Malhotra | G06N 3/08 |
| 2020/0027014 | A1* | 1/2020 | Wen | G06F 9/5077 |

(Continued)

OTHER PUBLICATIONS

Chen, Wen-Shyen Eric, Chun-Fang Huang, and Ming-Jen Huang. "ISDS: a self-configurable software-defined storage system for enterprise." Enterprise Information Systems 12.1 (2018): 54-75. (Year: 2018).*

(Continued)

*Primary Examiner* — Michael J Huntley
*Assistant Examiner* — Sehwan Kim
(74) *Attorney, Agent, or Firm* — King Intellectual Asset Management (57) ABSTRACT

Systems and methods for analyzing the usage of a set of workloads in a hyper-converged infrastructure are disclosed. A neural network model is trained based upon historical usage data of the set of workloads. The neural network model can make usage predictions of future demands on the set of workloads to minimize over-allocation or under-allocation of resources to the workloads.

20 Claims, 5 Drawing Sheets

(56) References Cited

U.S. PATENT DOCUMENTS

2020/0116504 A1* 4/2020 Sun .................. G08G 1/0112

OTHER PUBLICATIONS

Kumar, Jitendra, Rimsha Goomer, and Ashutosh Kumar Singh. "Long short term memory recurrent neural network (LSTM-RNN) based workload forecasting model for cloud datacenters." Procedia Computer Science 125 (2018): 676-682. (Year: 2018).*

Pei, Ercheng, et al. "Multimodal dimensional affect recognition using deep bidirectional long short-term memory recurrent neural networks." 2015 International Conference on Affective Computing and Intelligent Interaction (ACII). IEEE, 2015. (Year: 2015).*

Patel, Jemishkumar, et al. "Workload estimation for improving resource management decisions in the cloud." 2015 IEEE Twelfth International Symposium on Autonomous Decentralized Systems. IEEE, 2015. (Year: 2015).*

* cited by examiner

NEURAL NETWORK MODEL FOR PREDICTING USAGE IN A HYPER-CONVERGED INFRASTRUCTURE

BACKGROUND

A hyper-converged infrastructure can provide an enterprise with modular and expandable central processing unit (CPU), memory, storage, and network resources as well as system backup and recovery. In a hyper-converged infrastructure, CPU, memory, storage, and network resources are brought together using preconfigured and integrated hardware. Tasks can be allocated to hardware that is capable of performing the allotted task. When a task or workload requires more resources, additional hardware can be assigned to the task, for example, using virtualization software.

Tasks, such as applications or virtual machines, can be allocated across a fleet of physical machines in a cluster of machines by a resource scheduler. The resource scheduler can allocate and balance computing capacity across machines that are aggregated into logical resource pools. The resource scheduler can also allocate resources based upon projected usage demand for one or more workloads. For example, a set of workloads that provides a streaming video platform for a particular organization might have historical usage demands on the video platform that can be used to project future usage of the platform.

However, historical usage does not always accurately predict future demand on a system. For example, the usage demands placed on a streaming video platform in a given year might not exactly mimic the usage history of the previous calendar year due to various unforeseen events. In this situation, an administrator is often placed in a situation where physical resources (e.g., CPU, memory, and storage) are over-allocated to a set of workloads, which has its attendant costs. Conversely, the administrator might also under-allocate resources to the set of resources, which can impact performance of the system. Therefore, improved mechanisms for predicting usage of a set of workloads can help an administrator of a hyper-converged infrastructure allocate physical resources in an efficient manner.

BRIEF DESCRIPTION OF THE DRAWINGS

Many aspects of the present disclosure can be better understood with reference to the following drawings. The components in the drawings are not necessarily to scale, with emphasis instead being placed upon clearly illustrating the principles of the disclosure. Moreover, in the drawings, like reference numerals designate corresponding parts throughout the several views.

DETAILED DESCRIPTION

The present disclosure relates to generating usage predictions for a set of workloads, such as virtual machines or applications, within a hyper-converged infrastructure (HCI) and other infrastructures for providing CPU, memory, storage, and network resources that are brought together using integrated hardware. For example, a set of CPU, memory, and storage resources can be allocated within a hyper-converged infrastructure to provide a streaming video platform, an email server, a document management system, or any platform that requires CPU and memory resources and that can be implemented within a HCI. Accurately allocating physical resources within the HCI, such as CPU, memory, and storage resources, can be an important factor in ensuring uptime as well as an appropriate level of performance for the system.

Cloud computing offers the potential for more cost-effective implementations of various systems and platforms as opposed to implementing a platform using in-house resources. Utilizing an HCI or cloud infrastructure removes the need for tenants of the infrastructure to maintain their own complex computing infrastructures themselves. However, the costs of implementing systems in the cloud are typically related to the amount of CPU, memory, storage, and network resources consumed by the system. Therefore, an important consideration is accurately allocating resources to avoid over-provisioning or under-provisioning, both of which lead to potentially higher costs to the customer. Over-provisioning wastes resources that could be put to other uses or can create unnecessary costs for a customer. Under-provisioning resources can impact performance, uptime and also cause potential service level agreement (SLA) violations, which can be tied to financial penalties.

Many solutions for provisioning resources with an HCI provide manual controls for the addition or removal of hosts, which result in a customer having to determine which resource allocation schemes or calendars work for them. Although a customer is given the ultimate control and freedom to allocate resources as they see fit, fully manual controls with limited or no recommendations for adjusting resource allocation can result in under-provisioning or over-provisioning because administrators might unaware of the appropriate amount of resources to allot to a set of workloads given current usage demand until it becomes too late. If resource allocation measures are not taken in a proactive way, performance and system uptime can suffer.

Examples of this disclosure provide a neural network based usage prediction system that can generate usage predictions that can inform resource allocation decisions before the usage demand arrives at the system. Additionally, a validation mechanism that can validate the predictions generated by the neural network is also provided. In one implementation, a long short-term memory recurrent neural network (LSTM-RNN) can generate usage predictions based upon historical usage demand of a particular system. The usage prediction can be translated into a resource allocation metric that drives the allocation of CPU, memory, or storage resources within a HCI. The usage predictions can be made for a set of workloads executing on one or more physical host devices within a HCI or virtual data center (VDC). Workloads can include virtual machines or applications that are executed on host devices, or computing devices, that are deployed within a hyper-converged infrastructure. Validation of the usage predictions can be based on actual usage demand that is observed by the set of workloads implemented on the HCI.

Figure 1:
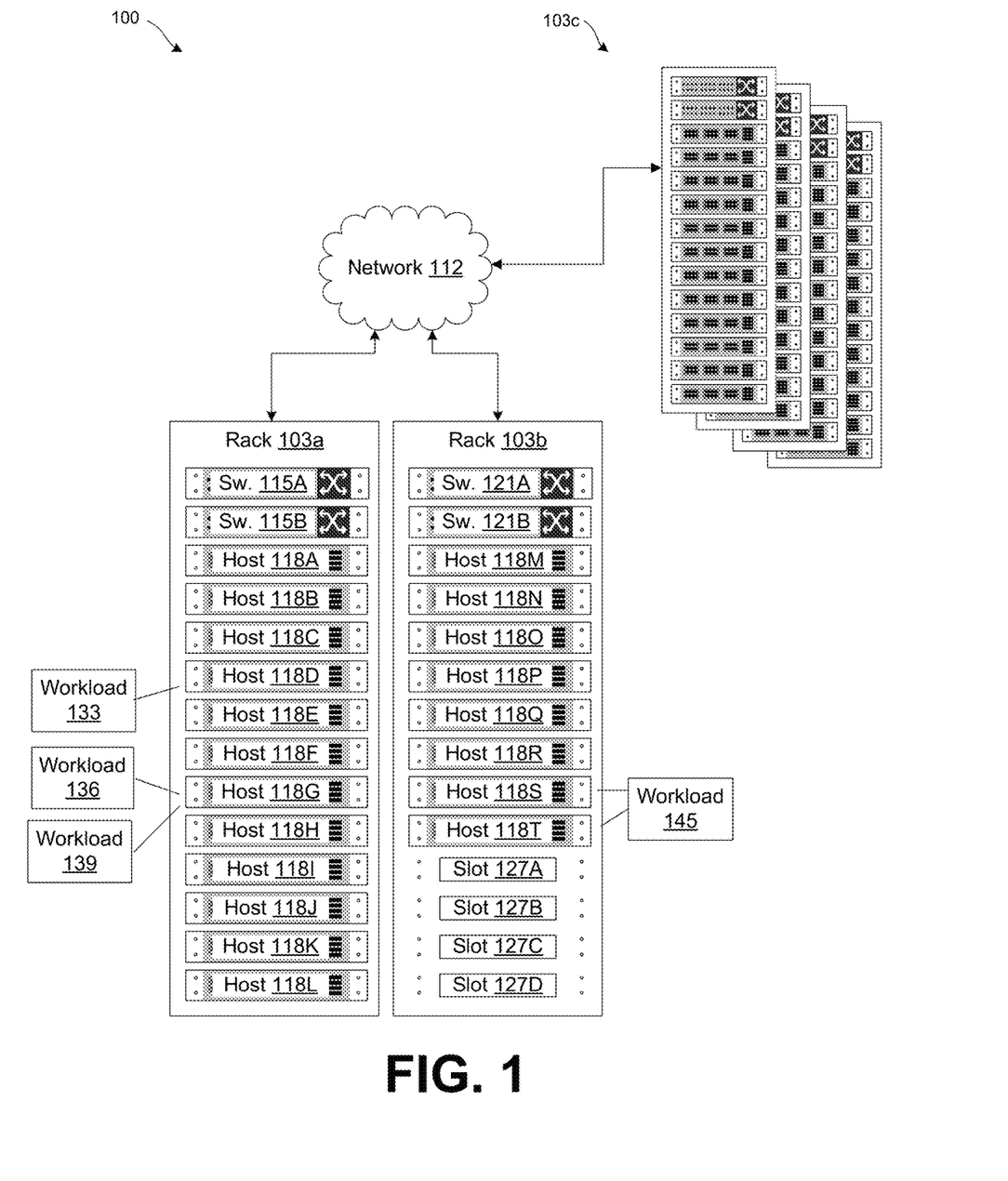
FIG. 1 is a drawing of an example of a cloud environment including components connected through a network.

With reference to FIG. 1, shown is an example of a cloud environment 100. The cloud environment 100 can have components including one or more racks 103*a* and 103*b* in communication with one another over a network 112. The racks 103 can include computing resources, such as CPU, storage, and memory resources that comprise a hyper-converged environment. A multi-tenant environment can be implemented in which various tenants or customers can implemented their respective virtual data centers (VDC's) within the multi-tenant environment. For example, a tenant can implement a streaming video platform among various virtual machines and storage nodes that are implemented across various host devices within the cloud environment 100. A separate tenant can implement a website in a different VDC using common or separate host devices within the cloud environment 100. Each tenant can request additional resources to be allocated to their respective workloads, and a cloud management service can assign the specific physical resources within the cloud environment 100 as requested.

Returning to FIG. 1, the network 112 can include, for example, the Internet, intranets, extranets, wide area networks (WANs), local area networks (LANs), wired networks, wireless networks, other suitable networks, or any combination of two or more such networks. For example, the networks can include satellite networks, cable networks, Ethernet networks, cellular networks, telephony networks, and other types of networks. The network 112 can also include switches, routers, and other network devices. The network devices can include network devices that are held or integrated within racks and network devices that are external to the racks.

A rack 103 can be part of a hyper-converged infrastructure and contain compute, memory, storage, and network resources that are provided using integrated and/or preconfigured hardware. In other cases, a rack can be part of a converged infrastructure or another type of infrastructure. The rack 103 can contain various networking, computing, and storage hardware atop of which various workloads belonging to various tenants can be implemented. In one example, a rack 103 can have one or more network switches, or slots for switches or other network devices. For example, the rack 103 can have switches 115A and 115B. The switches 115A and 115B can be top-of-rack switches or other integrated network devices of the rack 103. While not shown, the switches 115 can also be further connected to other switches and network devices of the site 109, including spine switches, End-of-Row switches, Middle-of-Row switches, or other switches, routers, and the like. The switches 115 can also be connected to routers, which can route traffic between racks or between sites. The rack 103 can also include a number of hosts, or a preconfigured number of slots or bays for hosts. In the context of this disclosure, a host can comprise a computing device with CPU, memory, or storage resources that can be assigned to one or more workloads executing within the cloud environment 100.

For example, the rack 103 can have hosts 118A-118L (collectively, "hosts 118"). Where the rack 103 is part of a hyper-converged infrastructure, each of the hosts 118 can provide various levels of CPU, memory, storage, and network resources. Each of the hosts 118 can be connected to the network 112 through the switches 115A and 115B. For example, the host 118 can include two NICs connected to the switches 115A and 115B. Individual ones of the hosts 118 can be connected to both a port of the switch 115A and a port of the switch 115B. While the hosts 118 are connected to the network 112 through the switches 115A and 115B, the switches 115A and 115B can be considered a part of the network 112, as can network cards or controllers of the individual hosts.

Similarly, other racks 103 within the environment, such as rack 103b, can include hosts, or a quantity of slots or bays for hosts. For example, the rack 105 can have hosts 118M-118T as well as slots 127A-127D (slots 127). The slots 127 can accommodate or accept additional hosts to expand the CPU, memory, storage, network, and other resources provided by the rack 105. Where the rack 105 is part of a hyper-converged infrastructure, each of the hosts 118 can provide compute, memory, storage, and network resources. The hosts 118 can be connected to the network 112 through the switches 121A and 121B. For example, individual ones of the hosts 118 can be connected to both a port of the switch 121A and a port of the switch 121B.

Each of the hosts 118, or host devices, can be a processor-based system, such as a computer system, and can include at least one computing device, at least one storage device, and at least one network device. While referred to in the singular for clarity, multiple computing devices, storage devices, and network devices can be included in each host. The computing device can include a processor circuit, such as one that includes a processor and a memory. The storage devices can include memory devices including, for example, random access memory (RAM), read-only memory (ROM), hard drive, solid-state drive, USB flash drive, memory card, optical disc such as compact disc (CD) or digital versatile disc (DVD), floppy disk, magnetic tape, or other memory components. The network devices can include network interface controllers or network interface cards (NICs), switches, routers, and other network devices. The hosts can be utilized to perform or execute instructions, including processes, programs, applications, and other tasks that can be utilized in concert, for example, using software like the cloud management platform 203, VMware vSphere®, vSAN®, NSX®, ESX®, ESXi®, and other virtualization software or tools.

Additionally, the hosts 118 can vary in their respective capabilities. For example, host 118A might be configured with multiple high performance processors and limited storage resources, while host 118B is configured with limited CPU resources and ample mass storage resources that can be used by various tenants within the cloud environment 100. The racks 103 can be part of a single site or as a part of a geographically disparate configuration of various racks 103. In some cases, one or more of the sites can be provided by a service that provides CPU, memory, storage, network, and other resources to an enterprise or another customer of the service. In other cases, one or more of the sites can also be owned or operated by the enterprise.

Software instructions can provide and assign resources using containers called workload domains. A workload domain can be one or more workloads that is a physical collection of compute, memory, storage, and network resources that provide uniform characteristics to applications and tasks such as security, data protection, performance, availability, and modular expandability. A workload domain can perform or execute tasks, including applications, programs, and other instructions. Workload domains can provide a virtual machine for a user, infrastructure as a service (IaaS), platform as a service (PaaS), desktop as a service (DaaS)/virtual desktop infrastructure (VDI), or other compute tasks. These can be considered workload domain types, and workload domain types can further include test and development workload domain types, production workload domain types, and other domain types that can include any of these services or a combination of these and other services.

For example, a workload domain can provide a streaming video platform and include multiple workloads that provide various aspects of the platform. Some workloads or virtual machines can provide load balancing services for the platform. Other workloads can act as video storage devices. Still other workloads can transcode video and stream the transcoded video to client devices. While an established workload domain can be assigned any desired task, workload domains can have a particular purpose or usage characteristics. In other words, there can be various types of workload domains. During the creation of workloads, the application or task requirements of the workload can be translated to physical infrastructure requirements including a number of hosts to assign to the workload, each having CPU, memory, storage, and network resources.

Referring back to FIG. 1, the hosts 118D and 118G can be assigned to workloads 133, 136, and 139, respectively. In other words, these workloads can be executed on hosts 118D and 118G within the HCI. In one example, these workloads 133, 136, and 139 can represent virtual machines or applications that are executed on the hosts 118. Workload 145 can be executed by hosts 118S and 118T. In this example, additional physical resources that span multiple hosts 118 can be allocated to this particular workload 145. To facilitate execution of virtual machines, the hosts 118 can execute a hypervisor and other applications and services that allow for execution and management of virtual machines on the hosts 118.

Accordingly, an administrator, using tools provided by a cloud management platform 203, can allocate additional CPU, memory, and storage resources provided by one or more hosts 118 within the cloud environment 100 to a workload. Examples of this disclosure provide a mechanism to generate usage predictions so that physical resources can be more efficiently allocated to workloads within the networked environment. With this in mind, reference is now made to FIG. 2.

Figure 2:
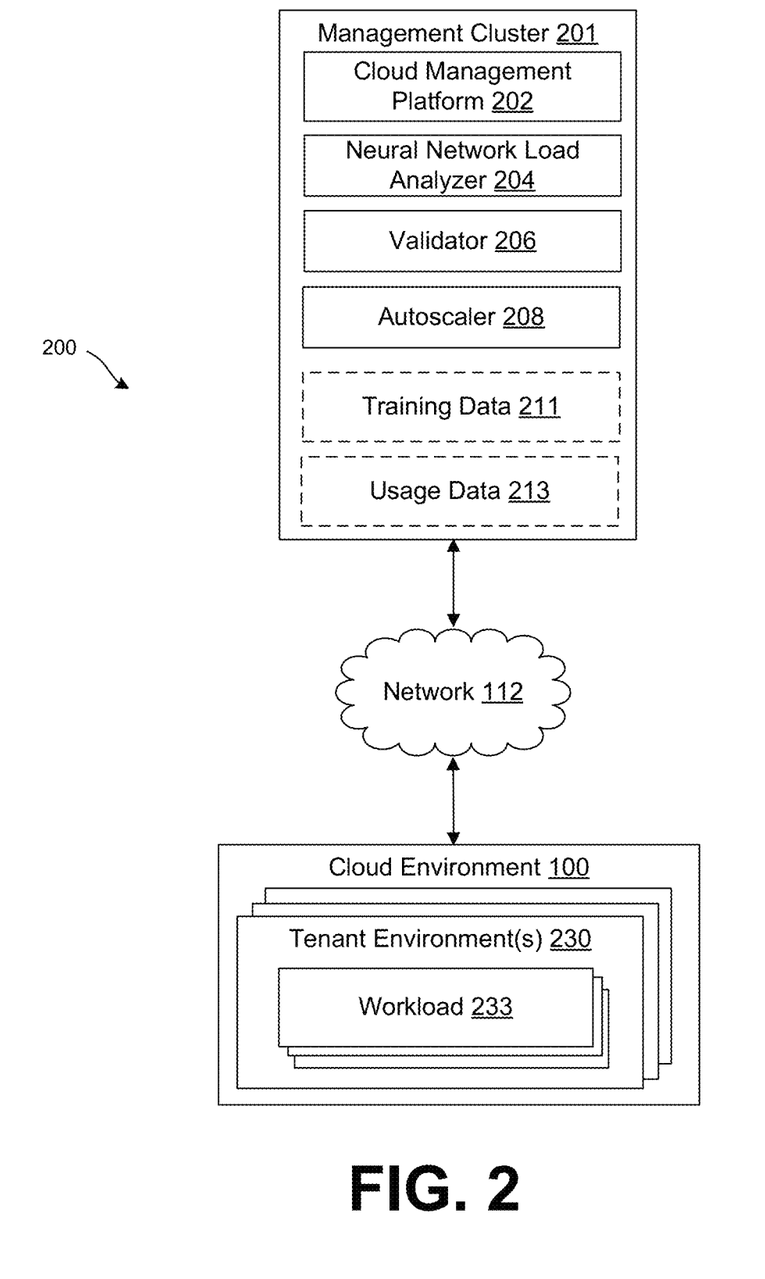
FIG. 2 is a drawing of an example of a networked environment including components connected through a network.

FIG. 2 shows is an example of components of a networked environment in communication through the network 112. The management cluster 201 represents an application or service that can be executed on a host device to manage and oversee the operation of a software defined datacenter. In one example, the management cluster 201 can execute a cloud management platform 202. The cloud management platform 202 represents an application or service that allows an administrator to manage or oversee the operation of a deployment of workloads within a cloud environment 100. VMware vSphere®, vSAN®, NSX®, ESX®, ESXi®, DRS®, a SDDC manager, and other virtualization software and tools can also be executed in the management cluster 201 and the various hosts and can work in concert with, and can be considered part of, the cloud management platform 202. The cloud management platform 202 can allow administrators to centrally monitor and administer all workloads, workload domains, applications, and tasks across individual sites or multiple sites, including local hardware, private cloud, public cloud, and hybrid cloud deployments. The cloud management platform 202 can also allow administrators to manage and deploy logical hardware resources, such as data stores, virtual machines, logical switches, logical routers, or other logical devices that are implemented on host devices within a software defined datacenter.

Administrators can deploy and manage workload domains in physical, virtual, and cloud environments with a unified management experience through at least one user interface generated by the cloud management platform 202. For example, administrators can create new workloads or workload domains through the user interface of the cloud management platform 202. Additionally, hosts can be manually assigned and shifted within the available hosts through the user interface of the cloud management platform 202. Administrators can configure and change properties, settings, and other configurations for particular workload domains. For example, a particular workload domain can be configured to have a certain priority, such as a low-priority workload domain setting or a high-priority workload domain setting. A particular workload domain can be further manually set to have a particular expected bandwidth requirement.

The cloud management platform 202 can allow an administrator to manage a tenant environment 230 for a customer or tenant in a multi-tenant environment. A tenant environment 230 can represent a set of workloads 233 that are running on behalf of a tenant within the cloud environment 100. Various tenant environments 230 can be implemented by various tenants across the hosts 118 within one or more racks 103 of a networked environment.

Workloads 233 can represent virtual machines or applications executed on host devices within the HCI. Workloads 233 can be executed on a host device that runs a hypervisor that facilitates access to the physical resources of the host device by workloads 233 running atop the hypervisor. For example, VDI functionalities, IaaS functionalities, SaaS functionalities, IoT functionalities, VMware® Photon OS, AirWatch®, and other functionalities and application types can be provided by executing workloads 233 on hosts 118. A group of workloads 233 that are associated with a particular tenant can be considered a workload domain of the tenant.

The cloud management platform 202 can communicate with a service implemented on a host 118 within the cloud environment 100 that can manage workloads 233 executed by the cloud environment 100. For example, a management service or management workload can be executed on a host 118 that can create or destroy workloads 233 executed on one or more hosts 118. For example, if an administrator of a particular tenant environment 230 creates a virtual machine and requests that it be deployed within the cloud environment 100, a management workload can determine which host 118 has available resources within the cloud environment 100 and cause the virtual machine to be executed on the appropriate host 118.

The neural network load analyzer 204 can generate usage predictions for a particular set of workloads 233 using a LSTM-RNN neural network. The neural network load analyzer 204 can operate based upon real-time data and historical usage data of the workloads 233. The usage data that is input into the neural network can include CPU, memory, or storage usage of a set of workloads 233. A recurrent neural network (RNN) can be used to facilitate analysis of a dynamically changing contextual window over the data that is input into the neural network. A dynamically changing contextual window can be chosen rather than a fixed-sized window that is used with feed-forward networks.

An important aspect of a LSTM-RNN is a cell state, which keeps track of pertinent information regarding the current context of the signal. For example, when predicting CPU utilization, the cell state can contain information of usage during a holiday, where the CPU demand will be low, and the system must now forget this state as CPU usage will resume its usual patterns once the holidays are over. A LSTM-RNN can utilize gates to optionally allow information through to the cell state. The gates can be composed of a sigmoid neural net layer and a pairwise multiplication operation.

The neural network can be trained using a set of training data 211, which represents historical usage of a particular set of workloads 233, which can be defined as a tenant environment 230. In many other systems, training of a neural network is done by a stochastic gradient descent applied to a loss function by comparing the network's current output to the values of the given training data. In the case of the LSTM-RNN employed by the neural network load analyzer 204, training can be performed utilizing a regression analysis on the training data 211 where the function applied is the least-squares error.

The training data 211 can represent CPU, memory, storage, and network demand of a set of workloads 233, or a usage demand. The usage demand can represent the demands placed on the set of workloads 233 through use of the set of workloads 233. For example, in the case of a streaming video platform, the usage demand represents the amount of CPU, memory, storage, and network demand that is placed on the workloads 233 in order to serve the video streams that are requested from the platform. The training data 211 can represent separate data sets for each of CPU, memory, storage, or network demand data of the set of workloads 233. Additionally, the neural network load analyzer 204 can implement separate neural networks for each of CPU, memory, storage, and network usage to generate separate usage predictions for each.

The usage data 213 can represent a stream of current usage or usage demand being placed on a particular set of workloads 233. For example, while the training data 211 can be used to train the neural network, the usage data 213 represents current or real-time usage obtained from the tenant environment 230 that can be used to generate usage predictions by the neural network load analyzer 204.

The neural network load analyzer 204 can generate a usage prediction for a given set of workloads 233, or a tenant environment 230, by analyzing the usage data 213 of the workloads 233. For example, a CPU usage prediction can be generated by the neural network load analyzer 204, which can inform an administrator how much CPU resources to allocate to a given set of workloads. Similarly, storage, memory, and network usage predictions can be generated by the neural network load analyzer 204 using a neural network trained based upon training data 211 that represents historical usage data of the set of workloads 233. The usage predictions can inform how much storage, memory, and network resources should be respectively allocated to the set of workloads 233.

The validator 206 represents an application or service that can perform ongoing validation of the usage predictions generated by the neural network load analyzer 204. The validator 206 can verify that the usage predictions correspond to actual demand being placed on a set of workloads 233 to ensure that resource allocation decisions are being accurately predicted. For example, if the neural network load analyzer 204 generates a CPU usage prediction of 100, the validator 206 can determine whether the actual demand being placed upon the set of workloads 233 is within a predetermined range of 100.

The validator 206 can calculate a similarity measure between the actual demand being placed on the set of workloads 233 and the usage prediction generated by the neural network load analyzer 204 over a given period of time. The validator 206 can utilize a dynamic time warping (DTW) signal processing algorithm to measure the similarity between the actual demand over a period of time and the usage predictions generated by the neural network load analyzer 204 over the same period of time. If the difference between the actual demand of the set of workloads 233 and the usage prediction is greater than a threshold, an administrator can be alerted or the usage prediction can be deemed invalid until the neural network load analyzer 204 is further trained with additional training data 211.

The validator 206 can facilitate retraining of the neural network model used by the neural network load analyzer 204 can input the data characterizing the actual demand placed on the set of workloads 233 into the neural network load analyzer 204 to retrain the neural network model. In this way, a feedback loop can be established that retrains the neural network model based upon real-time demand data associated with the workloads 233.

The autoscaler 208 represents an application or service that can obtain usage predictions generated by the neural network load analyzer 204 and translate the usage predictions into changes to the resources allocated to a set of workloads 233. In other words, the autoscaler 208 can resize workloads 233 associated with a particular tenant environment 230 by adjusting the CPU, memory, or storage resources that are allocated to a particular workload 233. Additionally, the autoscaler 208 can place workloads 233 onto particular hosts 118 depending upon the CPU, memory, or storage resources required by the workload 233. For example, an administrator, through the cloud management platform 203, might request that a particular VM be allocated 8 GB of memory resources. Accordingly, the autoscaler 208 can determine on which host 118 within the cloud environment 100 the VM should be executed. Should the memory requirements of the workload 233 be increased from 8 GB to 16 GB, the autoscaler 208 can either relocate the workload 233 to another host or allocate additional memory from the workload's 233 current host 118. The autoscaler 208 can perform similarly with respect to storage, CPU, and network bandwidth requirements of workloads 233.

Figure 3:
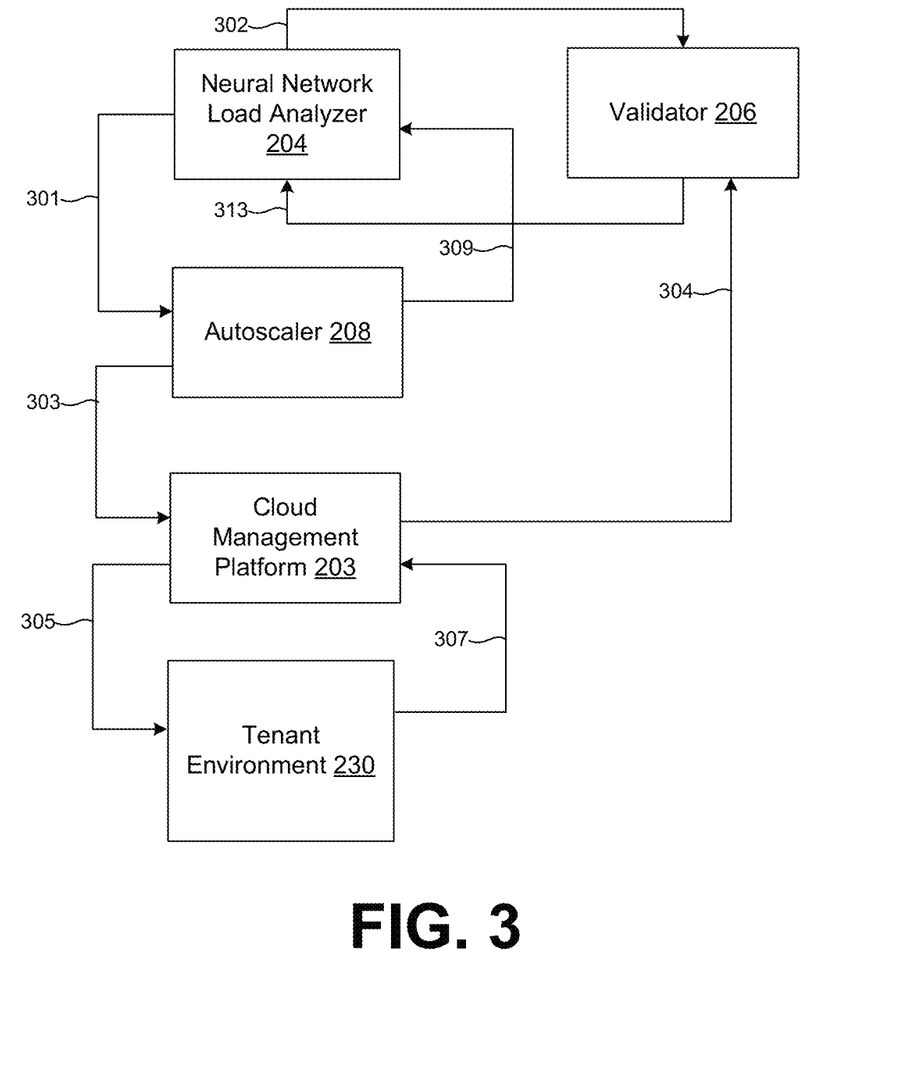
FIG. 3 is a drawing further illustrating components of the networked environment of FIG. 1.

Referring to FIG. 3, shown is diagram describing information flow between the components shown in FIG. 2. FIG. 3 illustrates how the neural network load analyzer 204 can generate usage predictions that influence resource allocation within the cloud environment 100. First, at step 301, the neural network load analyzer 204, based upon its trained neural network model, can generate usage predictions that relate to CPU, memory, storage, or network resources of a particular set of workloads 233 within the cloud environment 100. More specifically, the usage predictions can relate to a particular tenant environment 230. The usage predictions can be provided to the autoscaler 208.

At step 302, the neural network load analyzer 204 can also provide the usage predictions for a particular set of workloads 233 to the validator 206. The validator 206 can validate whether the usage predictions are accurate as compared to actual usage demand obtained from the tenant environment 230 or the cloud management platform 203. The validator 206 can validate the usage predictions by utilizing a DTW algorithm that compares actual demand with the usage prediction. The actual demand of the tenant environment 230 can be obtained from the cloud management platform 203 at step 304. In some implementations, the actual usage of the tenant environment 230 can be obtained directly from a workload 233 within the tenant environment 230.

At step 303, the autoscaler 208 can generate resource allocation decisions from the usage predictions and provide the resource allocation decisions to the cloud management platform 203. The autoscaler 208 can generate resource allocation decisions by determining whether the current CPU, memory, storage, or network allocations for a set of workloads 233 should be increased or decreased in response to the usage predictions generated by the neural network model. At step 309, the autoscaler 208 can poll the neural network load analyzer 204 for a usage prediction with which changes to resource allocation can be made by the autoscaler 208.

At step 305, the cloud management platform 203 can provide the resource allocation decisions generated by the autoscaler 208 to the tenant environment 230. The cloud management platform 203 can relocate one or more of the set of workloads 233 within the tenant environment 230 or adjust the resources allocated to one or more of the workloads 233 to the extent that the resource allocation decisions require adjustments.

At step 307, the cloud management platform 203 can obtain actual usage data from the workloads 233 within the tenant environment 230. The actual usage data can be used to determine actual demand upon the tenant environment 230 that are placed on the workloads 233 by real-world usage of the workloads 233. For example, in the case of a streaming video platform, the actual demand can represent the load being placed on the video platform by users who are streaming video from the platform.

At step 313, the validator 206 can cause the neural network model of the neural network load analyzer 204 to be updated if the similarity measure indicates that high degree of variance between the usage predictions generated by the neural network load analyzer 204 and the actual demand data obtained at step 304. In this way, a feedback loop is established that updates and re-trains the model over time.

Figure 4:
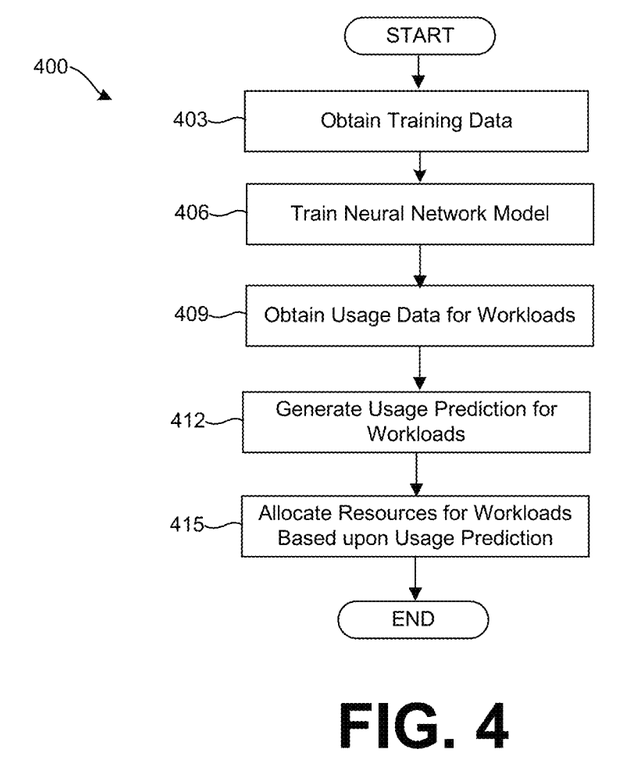
FIG. 4 is an example flowchart illustrating functionalities implemented by components of the networked environment.

Referring to FIG. 4, shown is an example flowchart 400 describing steps that can be performed by the components of the cloud environment 100 of FIG. 1. Generally, the flowchart 400 describes how the management cluster 201 executing the neural network load analyzer 204 can identify generate usage predictions and allocate resource to workloads 233 based upon the neural network model.

First, at step 403, the neural network load analyzer 204 can obtain training data 211 associated with a particular tenant environment 230 or set of workloads 233. The training data 211 can represent historical usage data for CPU, memory, network, or storage resources. The training data 211 can also represent historical demand placed onto the set of workloads 233 by usage of a system implemented by the workloads 233.

At step 406, the neural network load analyzer 204 can train the neural network model using the training data 211. The neural network load model can be implemented as a LSTM-RNN neural network. The neural network model can operate based upon real-time data and historical usage data of the workloads 233. The usage data that is input into the neural network can include CPU, memory, or storage usage of a set of workloads 233.

At step 409, the neural network load analyzer 204 can obtain real time usage data associated with the set of workloads 233. Again, the usage data that is input into the neural network can include CPU, memory, or storage usage of a set of workloads 233. The usage data can reflect the current state of the set of workloads 233, and because the neural network model has been trained on historical usage data of the workloads 233, the model can predict future demand of the system.

The recurrent neural network can employ a dynamically changing contextual window over the data that is input into the neural network. A dynamically changing contextual window can be chosen rather than a fixed-sized window to adjust the time-window of data that is being used to generate usage predictions.

At step 412, the neural network load analyzer 204 can generate usage predictions for the set of workloads 233. The usage predictions can include a predicted CPU, network, memory, or storage usage for a particular period of time. The usage predictions can be provided to the autoscaler 208, which can translate the usage predictions into the updates to the CPU, network, memory, or storage resource allocations for the set of workloads 233. The usage predictions are based on the usage data 213 stream associated with the tenant environment 230 or set of workloads 233 that the neural network model is trained to analyze.

At step 415, the autoscaler 208 can communicate with the cloud management platform 203 or the tenant environment 230 to update the resources allocated to the set of workloads 233. A resource allocation decision can represent a change in the CPU, network, storage, or memory resources that are allocated to a particular set of workloads 233. Thereafter, the process can proceed to completion.

Figure 5:
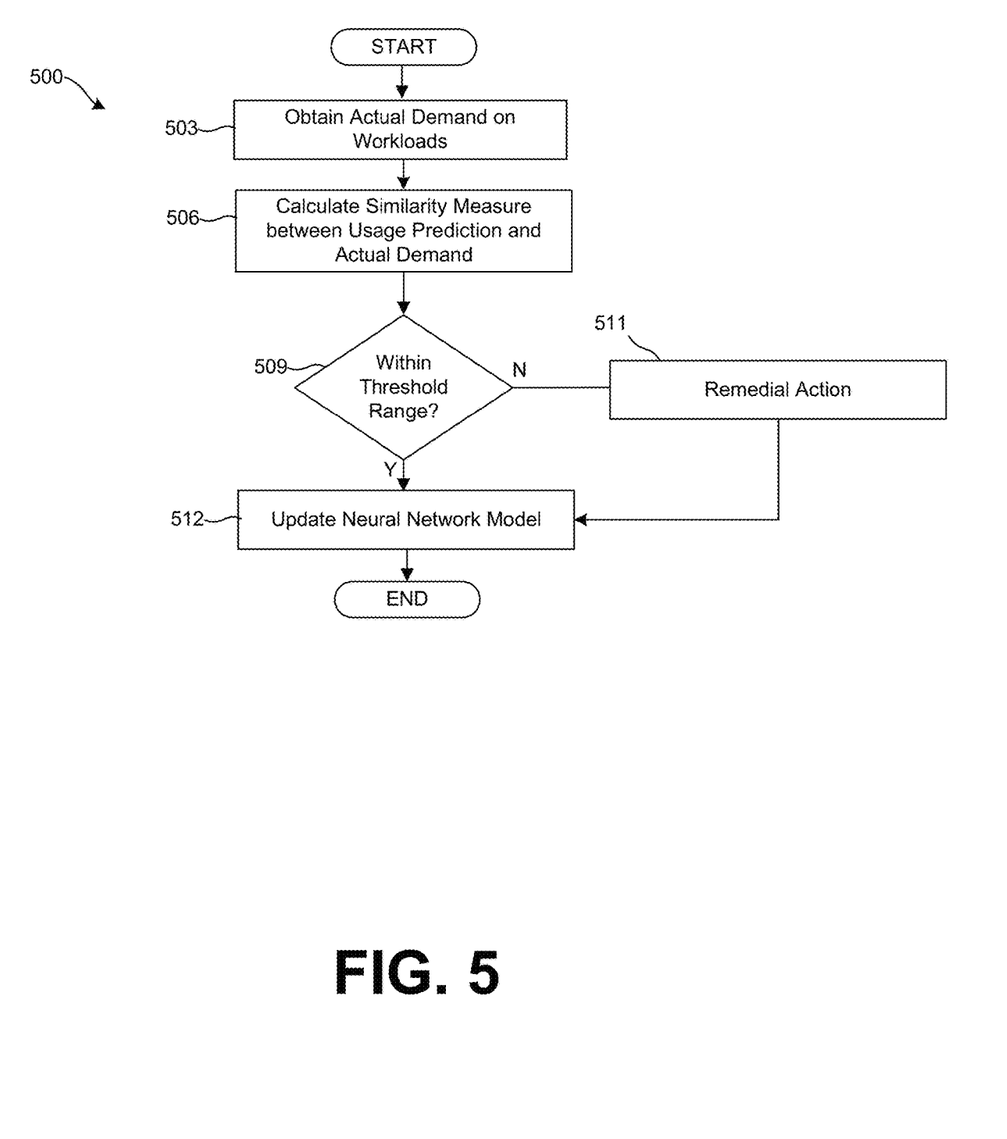
FIG. 5 is an example flowchart illustrating functionalities implemented by components of the networked environment.

Referring to FIG. 5, shown is an example flowchart 500 describing steps that can be performed by the components of the cloud environment 100 of FIG. 1. Generally, the flowchart 500 describes how the management cluster 201 can complete a feedback loop in which actual demand of a set of workloads 233 is obtained and update the neural network model of the neural network load analyzer 204.

First, at step 503, the validator 206 can obtain data characterizing the actual demand placed on the set of workloads 233. The actual demand data is associated with the actual CPU, memory, storage, or network usage of the set of workloads 233 resulting from real world usage of a system implemented by the workloads 233. The actual demand data can be streamed in real-time to the validator from the cloud management platform 203 or the tenant environment 230.

At step 506, the validator 206 can calculate a similarity measure that characterizes the similarity of the actual demand placed on the workloads 233 with the usage predictions generated by the neural network load analyzer 204. The validator 206 can utilize a DTW signal processing algorithm to measure the similarity between the actual demand over a period of time and the usage predictions generated by the neural network load analyzer 204 over the same period of time.

At step 509, the validator 206 can determine, based on the similarity measure, whether the difference between the actual demand of the set of workloads 233 and the usage prediction meets a threshold. If difference between the two is less than a threshold, the process can proceed to step 512. By proceeding to step 512, the validator 206 can deem the usage predictions as accurate and allow the neural network load analyzer 204 to continue generating usage predictions and the autoscaler 208 to keep adjusting resource allocations of the workloads 233. If the difference between the two is equal or greater than a threshold, the process can proceed to step 511. By proceeding to step 511, the validator 206 can deem the usage predictions as inaccurate such that remedial actions can be taken.

At step 511, if the difference between the usage prediction and the actual demand placed on the workloads 233 is equal or greater than a threshold, the usage prediction has resulted in under-allocation or over-allocation of physical resources to the workloads 233. Accordingly, remedial actions can be taken. In some cases, an administrator of the tenant environment 230 can be notified. In other cases, the autoscaler 208 can be notified and automatically taken action to modify the allocation of physical resources within the cloud environment 100 to the workloads 233.

At step 512, the validator 206 can provide the actual demand data back to the neural network load analyzer 204. The neural network model can be updated or retrained on an ongoing basis using the actual demand data. In some cases, the neural network model can be updated or retrained asynchronously or periodically.

A number of software components are stored in the memory and executable by a processor. In this respect, the term "executable" means a program file that is in a form that can ultimately be run by the processor. Examples of executable programs can be a compiled program that can be translated into machine code in a format that can be loaded into a random access portion of one or more of the memory devices and run by the processor, code that can be expressed in a format such as object code that is capable of being loaded into a random access portion of the one or more memory devices and executed by the processor, or code that can be interpreted by another executable program to generate instructions in a random access portion of the memory devices to be executed by the processor. An executable program can be stored in any portion or component of the memory devices including, for example, random access memory (RAM), read-only memory (ROM), hard drive, solid-state drive, USB flash drive, memory card, optical disc such as compact disc (CD) or digital versatile disc (DVD), floppy disk, magnetic tape, or other memory components.

Memory can include both volatile and nonvolatile memory and data storage components. Also, a processor can represent multiple processors and/or multiple processor cores, and the one or more memory devices can represent multiple memories that operate in parallel processing circuits, respectively. Memory devices can also represent a combination of various types of storage devices, such as RAM, mass storage devices, flash memory, or hard disk storage. In such a case, a local interface can be an appropriate network that facilitates communication between any two of the multiple processors or between any processor and any of the memory devices. The local interface can include additional systems designed to coordinate this communication, including, for example, performing load balancing. The processor can be of electrical or of some other available construction.

Although the cloud management platform 203 or other applications and other various services and functions described can be embodied in software or code executed by general purpose hardware as discussed above, as an alternative the same can also be embodied in dedicated hardware or a combination of software/general purpose hardware and dedicated hardware. If embodied in dedicated hardware, each can be implemented as a circuit or state machine that employs any one of or a combination of a number of technologies. These technologies can include discrete logic circuits having logic gates for implementing various logic functions upon an application of one or more data signals, application specific integrated circuits (ASICs) having appropriate logic gates, field-programmable gate arrays (FPGAs), or other components.

The flowcharts show an example of the functionality and operation of an implementation of portions of components described. If embodied in software, each block can represent a module, segment, or portion of code that can include program instructions to implement the specified logical function(s). The program instructions can be embodied in the form of source code that can include human-readable statements written in a programming language or machine code that can include numerical instructions recognizable by a suitable execution system such as a processor in a computer system or other system. The machine code can be converted from the source code. If embodied in hardware, each block can represent a circuit or a number of interconnected circuits to implement the specified logical function(s).

Although the flowcharts show a specific order of execution, it is understood that the order of execution can differ from that which is depicted. For example, the order of execution of two or more blocks can be scrambled relative to the order shown. Also, two or more blocks shown in succession can be executed concurrently or with partial concurrence. Further, in some embodiments, one or more of the blocks shown in the drawings can be skipped or omitted.

Also, any logic or application described that includes software or code can be embodied in any non-transitory computer-readable medium for use by or in connection with an instruction execution system such as a processor in a computer system or other system. In this sense, the logic can include, for example, statements including instructions and declarations that can be fetched from the computer-readable medium and executed by the instruction execution system. In the context of the present disclosure, a computer-readable medium can be any medium that can contain, store, or maintain the logic or application described for use by or in connection with the instruction execution system.

The computer-readable medium can include any one of many physical media, such as magnetic, optical, or semiconductor media. More specific examples of a suitable computer-readable medium include solid-state drives or flash memory. Further, any logic or application described can be implemented and structured in a variety of ways. For example, one or more applications can be implemented as modules or components of a single application. Further, one or more applications described can be executed in shared or separate computing devices or a combination thereof. For example, a plurality of the applications described can execute in the same computing device, or in multiple computing devices.

It is emphasized that the above-described embodiments of the present disclosure are merely possible examples of implementations described for a clear understanding of the principles of the disclosure. Many variations and modifications can be made to the above-described embodiments without departing substantially from the spirit and principles of the disclosure. All such modifications and variations are intended to be included within the scope of this disclosure.

Therefore, the following is claimed:

1. A method, comprising:
   obtaining, by at least one computing device, a training dataset for a neural network executed by the at least one computing device, the training dataset comprising historical data associated with resource consumption of a set of workloads within a hyper-converged infrastructure, wherein the neural network comprises a long short term memory recurrent neural network operating on a time window input, the neural network further utilizing gates comprising a sigmoid neural net layer and a pairwise multiplication operation;
   training the neural network based upon the training dataset, the training dataset comprising historical usage of the set of workloads, using a regression analysis applying a least-square error function;
   monitoring, by the at least one computing device, usage demand for a particular time period, the usage demand associated with the set of workloads within the hyper-converged infrastructure executed on a plurality of host devices;
providing the usage demand to the neural network;
generating a usage prediction based upon the usage demand, the usage prediction comprising a predicted resource consumption for the set of workloads over a time period;
adjusting an allocation of physical resources within the hyper-converged infrastructure for the set of workloads based upon the usage prediction; and
validating the allocation of the physical resources by performing an ongoing validation of the usage prediction relative to an actual usage demand being placed upon the set of workloads by calculating a similarity measure utilizing a dynamic time warping signal processing algorithm, wherein the neural network can be retrained in response to the similarity measure indicating a difference between the actual usage demand and the usage prediction being greater than a threshold.

2. The method of claim 1, wherein the resource consumption comprises memory, central processing unit (CPU), and storage usage of the set of workloads.

3. The method of claim 1, wherein the neural network is trained utilizing a regression model.

4. The method of claim 1, further comprising:
obtaining, using the at least one computing device, the actual usage demand for the time period.

5. The method of claim 1, further comprising:
retraining the neural network based upon the similarity between the actual usage demand and the usage prediction.

6. The method of claim 1, wherein adjusting the allocation of physical resources within the hyper-converged infrastructure comprises increasing or decreasing CPU, memory, or storage resources based upon the usage prediction.

7. The method of claim 1, wherein the set of workloads comprises one or more workloads, each of the one or more workloads comprising a virtual machine (VM) or an application running on a VM managed by a hypervisor using physical resources of one or more hosts.

8. A system comprising:
at least one computing device;
an application executed by the at least one computing device, the application causing the at least one computing device to at least:
obtain a training dataset for a neural network executed by the at least one computing device, the training dataset comprising historical data associated with resource consumption of a set of workloads within a hyper-converged infrastructure, wherein the neural network comprises a long short term memory recurrent neural network operating on a time window input, the neural network further utilizing gates comprising a sigmoid neural net layer and a pairwise multiplication operation;
train the neural network based upon the training dataset, the training dataset comprising historical usage of the set of workloads, using a regression analysis applying a least-square error function;
monitor usage demand for a particular time period, the usage demand associated with the set of workloads within the hyper-converged infrastructure executed on a plurality of host devices;
provide the usage demand to the neural network;
generate a usage prediction based upon the usage demand, the usage prediction comprising a predicted resource consumption for the set of workloads over a time period;
adjust an allocation of physical resources within the hyper-converged infrastructure for the set of workloads based upon the usage prediction; and
validate the allocation of the physical resources by performing an ongoing validation of the usage prediction relative to an actual usage demand being placed upon the set of workloads by calculating a similarity measure utilizing a dynamic time warping signal processing algorithm, wherein the neural network can be retrained in response to the similarity measure indicating a difference between the actual usage demand and the usage prediction being greater than a threshold.

9. The system of claim 8, wherein the resource consumption comprises memory, central processing unit (CPU), and storage usage of the set of workloads.

10. The system of claim 8, wherein the neural network is trained utilizing a regression model.

11. The system of claim 8, wherein the application causes the at least one computing device to at least:
obtain the actual usage demand for the time period.

12. The system of claim 8, wherein the application causes the at least one computing device to at least:
retrain the neural network based upon the similarity between the actual usage demand and the usage prediction.

13. The system of claim 8, wherein the allocation of physical resources within the hyper-converged infrastructure is adjusted by increasing or decreasing CPU, memory, or storage resources based upon the usage prediction.

14. The system of claim 8, wherein the set of workloads comprises one or more workloads, each of the one or more workloads comprising a virtual machine (VM) or an application running on a VM managed by a hypervisor using physical resources of one or more hosts.

15. A non-transitory computer-readable medium embodying a program executed by at least one computing device, the program causing the at least one computing device to at least:
obtain a training dataset for a neural network executed by the at least one computing device, the training dataset comprising historical data associated with resource consumption of a set of workloads within a hyper-converged infrastructure, wherein the neural network comprises a long short term memory recurrent neural network operating on a time window input, the neural network further utilizing gates comprising a sigmoid neural net layer and a pairwise multiplication operation;
train the neural network based upon the training dataset, the training dataset comprising historical usage of the set of workloads, using a regression analysis applying a least-square error function;
monitor usage demand for a particular time period, the usage demand associated with the set of workloads within the hyper-converged infrastructure executed on a plurality of host devices;
provide the usage demand to the neural network;
generate a usage prediction based upon the usage demand, the usage prediction comprising a predicted resource consumption for the set of workloads over a time period;

adjust an allocation of physical resources within the hyper-converged infrastructure for the set of workloads based upon the usage prediction; and validate the allocation of the physical resources by performing an ongoing validation of the usage prediction relative to an actual usage demand being placed upon the set of workloads by calculating a similarity measure utilizing a dynamic time warping signal processing algorithm, wherein the neural network can be retrained in response to the similarity measure indicating a difference between the actual usage demand and the usage prediction being greater than a threshold.

16. The non-transitory computer-readable medium of claim 15, wherein the resource consumption comprises memory, central processing unit (CPU), and storage usage of the set of workloads.

17. The non-transitory computer-readable medium of claim 15, wherein the neural network is trained utilizing a regression model.

18. The non-transitory computer-readable medium of claim 15, wherein the program causes the at least one computing device to at least:

obtain the actual usage demand for the time period.

19. The non-transitory computer-readable medium of claim 15, wherein the program causes the at least one computing device to at least:

retrain the neural network based upon the similarity between the actual usage demand and the usage prediction.

20. The non-transitory computer-readable medium of claim 15, wherein the set of workloads comprises one or more workloads, each of the one or more workloads comprising a virtual machine (VM) or an application running on a VM managed by a hypervisor using physical resources of one or more hosts.

* * * * *